US011974018B2

(12) United States Patent
Hu et al.

(10) Patent No.: US 11,974,018 B2
(45) Date of Patent: Apr. 30, 2024

(54) RECOMMENDING AUDIOVISUAL CONTENT ITEMS TO A SUBSCRIBER BASED ON LOCATIONS VISITED BY THE SUBSCRIBER

(71) Applicant: ARRIS Enterprises LLC, Suwanee, GA (US)

(72) Inventors: Fenggen Hu, Shanghai (CN); Libo Sheng, Shanghai (CN); Jianguo Zhou, Shanghai (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 15/736,376

(22) PCT Filed: Jul. 7, 2017

(86) PCT No.: PCT/CN2017/092264
§ 371 (c)(1),
(2) Date: Dec. 14, 2017

(87) PCT Pub. No.: WO2019/006754
PCT Pub. Date: Jan. 10, 2019

(65) Prior Publication Data
US 2020/0120390 A1      Apr. 16, 2020

(51) Int. Cl.
*H04N 21/466*     (2011.01)
*H04N 21/414*     (2011.01)
(Continued)

(52) U.S. Cl.
CPC ... *H04N 21/4668* (2013.01); *H04N 21/41407* (2013.01); *H04N 21/4312* (2013.01);
(Continued)

(58) Field of Classification Search
CPC ........... H04N 21/4668; H04N 21/4312; H04N 21/4821; H04N 21/4524; H04N 21/4826;
(Continued)

(56) References Cited

U.S. PATENT DOCUMENTS

2008/0301737 A1   12/2008   Hjelmeland Almas et al.
2010/0010986 A1    1/2010   Icho et al.
(Continued)

FOREIGN PATENT DOCUMENTS

CN      104079976 A      10/2014
CN      106658161 A       5/2017

OTHER PUBLICATIONS

PCT Search Report & Written Opinion, RE: Application No. PCT/CN2017/092264, dated Apr. 4, 2018.
(Continued)

*Primary Examiner* — Oschta I Montoya
(74) *Attorney, Agent, or Firm* — Wenderoth, Lind & Ponack, L.L.P.

(57) ABSTRACT

Recommending audiovisual content items to a subscriber based on locations visited by the subscriber. Location information from a mobile device having GPS functionality is received. The location information includes locations the subscriber has visited with the mobile device. The various locations may be counted, ranked, and grouped. Interests of the subscriber are predicted based on the location information. One or more audiovisual content items associated with the predicted interest are selected. A determination regarding the predicted programming of interest being available is made. Item recommendations are generated for available ones of the selected audiovisual content items. A referral of the one or more item recommendations is presented to the subscriber. The subscriber may accept or reject the item recommendation within the referral and appropriate action
(Continued)

may be taken including initiating presentation of the selected audiovisual content item on a display or recording of the associated audiovisual content item.

17 Claims, 6 Drawing Sheets

(51) Int. Cl.
 H04N 21/431 (2011.01)
 H04N 21/433 (2011.01)
 H04N 21/4363 (2011.01)
 H04N 21/45 (2011.01)
 H04N 21/458 (2011.01)
 H04N 21/482 (2011.01)

(52) U.S. Cl.
 CPC ... *H04N 21/4334* (2013.01); *H04N 21/43637* (2013.01); *H04N 21/4524* (2013.01); *H04N 21/458* (2013.01); *H04N 21/4667* (2013.01); *H04N 21/4821* (2013.01); *H04N 21/4826* (2013.01)

(58) Field of Classification Search
 CPC ......... H04N 21/41407; H04N 21/4667; H04N 21/458; H04N 21/4334; H04N 21/43637
 See application file for complete search history.

(56) References Cited

U.S. PATENT DOCUMENTS

| | | | |
|---|---|---|---|
| 2010/0122288 A1 | 5/2010 | Minter et al. | |
| 2010/0229190 A1* | 9/2010 | Koo | H04N 7/161 |
| | | | 725/14 |
| 2011/0270517 A1 | 11/2011 | Benedetti | |
| 2013/0332953 A1* | 12/2013 | Howcroft | H04N 21/4662 |
| | | | 725/34 |
| 2014/0137153 A1* | 5/2014 | Fay | H04N 21/25866 |
| | | | 725/39 |
| 2015/0082352 A1* | 3/2015 | Cloutier | H04N 21/4826 |
| | | | 725/46 |
| 2016/0255162 A1* | 9/2016 | Frieder | G06F 16/58 |
| | | | 709/204 |
| 2017/0031996 A1* | 2/2017 | Priness | G06Q 30/06 |
| 2018/0316571 A1* | 11/2018 | Andrade | G06Q 10/0633 |

OTHER PUBLICATIONS

Extended European Search Report dated Sep. 2, 2020 in European Patent Application No. 17917122.8.

Office Action dated Jul. 19, 2021 in European Patent Application No. 17 917 122.8.

* cited by examiner

RECOMMENDING AUDIOVISUAL CONTENT ITEMS TO A SUBSCRIBER BASED ON LOCATIONS VISITED BY THE SUBSCRIBER

BACKGROUND

Consumers can receive audiovisual content on various devices including televisions (TVs), computers, tablets, smart phones and the like. The audiovisual content can be provided to the individuals via numerous sources including, but not limited to, media players (e.g., DVD), the Internet, network providers (e.g., cable, telephony, satellite) and streaming content providers (e.g., Netflix, Amazon).

Figure 1:
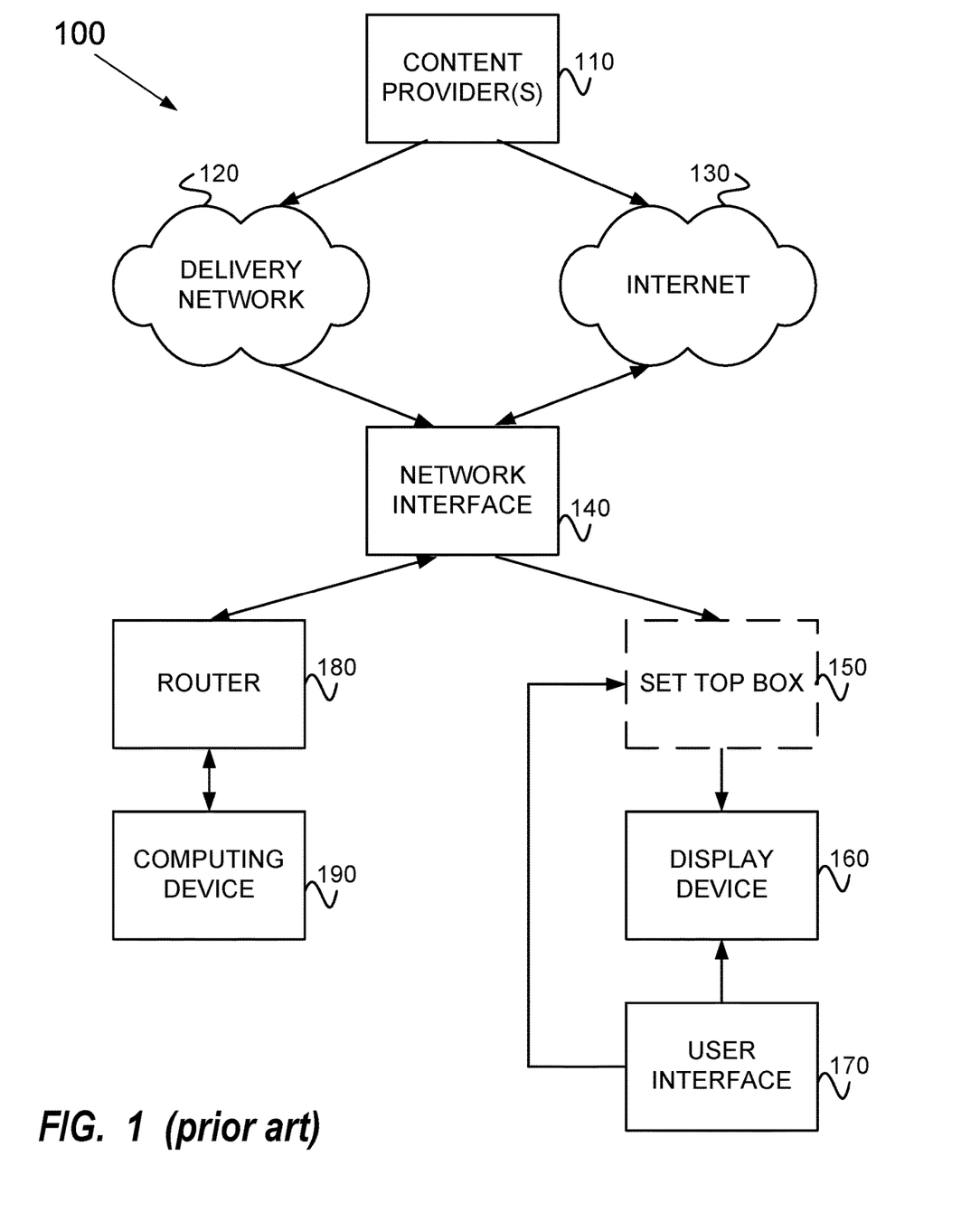
FIG. 1 illustrates an example high level system diagram for an audiovisual content delivery network.

FIG. 1 illustrates an example high level system diagram for an audiovisual content delivery network 100. The network 100 includes audiovisual content provider(s) 110 providing broadcast programming content and/or audiovisual media content for consumption by subscribers. The audiovisual content provider(s) 110 may be, for example, a network (e.g., NBC, CNN, ESPN, HBO) providing broadcast programming content or a repository of audiovisual content that can be selected for on-demand viewing. The delivery network 120 may be, for example, a cable network, a telephony network, or a satellite network. The delivery network 120 may provide audiovisual content from multiple audiovisual content providers 110. The delivery network 120 may provide the audiovisual content via broadcast channels that the subscriber may select and/or the audiovisual content may be selected for on-demand consumption. The entity that provides the delivery network 120 may also provide connectivity to the Internet 130. The audiovisual content provider(s) 110 may provide the audiovisual content via the Internet 130. The connectivity to the Internet 130 may also be provided by other entities.

A network interface 140 is the interface between the delivery network 120 and the Internet 130 and the subscriber location (e.g., residence). The network interface 140 may extract the audiovisual content delivered from the delivery network 120 and provide a communications link between a local network established in the subscriber location and the Internet 130. The network interface 140 may provide the extracted audiovisual content to an audio/video decoder. The audio/video decoder may decode/decompress the audiovisual content received. The audio/video decoder may be located in, for example, a set top box (STB) 150 that may perform additional functions. The STB 150 may provide the decoded/decompressed audiovisual content to a display device 160 for presentation to the subscriber. The display device 160 may be a television. According to one embodiment, the display device 160 may contain the audio/video decoder so that the STB 150 may not be required.

A user interface (UI) 170 may be utilized to control the display device 160 and/or the STB 150. The UI 170 may be a remote control, such as an infrared (IR) remote control. Alternatively, the STB 150 and/or the display device 160 may be capable of wireless communications and the UI 170 may be a wireless device, such as a tablet or smart phone configured to communicate therewith.

The system 100 may include a router 180 for communicating with the network interface 140 and providing an access point for the local network. Computing devices 190 may connect to the router 180 via a wireless connection or a wired connection. The router 180 is to enable the computing devices 190 to connect to other devices in the residence or to connect to the Internet 130. The computing devices 190 may be, for example, a computer, tablet, smart phone, or smart TV. The computing devices 190 may receive audiovisual content, for example, from the audiovisual content providers 110 via the Internet 130 using a browser or app. The computing device 190 may include an audio/video decoder for processing the audiovisual content received.

The various entities that provide subscribers with access to audiovisual content (e.g., network providers, streaming content providers) via the delivery network 120 or via the Internet 130 will henceforth be referred to individually or collectively as "service provider" for ease of description. The service providers may offer their subscribers access to an enormous amount of audiovisual content. In order to help their subscribers review the available audiovisual content and select the audiovisual content they desire to view, the service providers may organize the content in, for example, an electronic program guide ("EPG"). The EPG typically provides a selection guide for channels, audiovisual content and/or other media content available at a selected time or over a period of time. The EPG provides various information concerning the channels and audiovisual content available.

For audiovisual content available via the delivery network 120, the EPG is displayed on the display device 160 (e.g., television, media center device) receiving the audiovisual content that the subscriber is utilizing. According to one embodiment, the EPG could be displayed on the UI 170 (e.g., tablet, laptop or other computer, smart phone, mobile device, remote control unit, other electronic device associated with the subscriber) that is interacting with the STB 150 or the display device 160. For audiovisual content available via the Internet 130, the EPG may be displayed on the computing device 190 (e.g., television, media center device, tablet, laptop or other computer, smart phone, mobile device, other electronic device associated with the subscriber) receiving the audiovisual content that the subscriber is utilizing.

The EPG typically displays a listing of channels carried by the service provider, and information concerning the audiovisual content of each channel with respect to a particular day and time of day. Channels are typically listed using one or more identifiers (e.g., a channel number, an abbreviated or full name of a network or content provider, logo of a network or content provider, a set of call letters, and the like). Typically, the list of channels is ordered or sorted by one of the identifiers, such as by channel number. A user may scroll through the channels available for viewing by, for example, using "channel up" or "channel down" commands on a user interface (e.g., remote control). Similarly, a user can enter a channel number on a user interface for navigating directly to a selected channel.

The relatively large amount of audiovisual content available may present practical difficulties in a subscriber determining what they may want to watch as the subscriber may be overwhelmed by the amount of audiovisual content available. The service provider may provide an EPG that allows for sorting (e.g., by genre) and/or searching the audiovisual content available. The service provider may provide the subscriber with a customizable EPG or provide the subscriber with recommendations about the audiovisual content they may be interested in. The customization of the EPG and/or the recommendations may be based on the subscriber defining their viewing preferences (e.g., preferred channels, preferred shows, preferred viewing times, preferred genres). Alternatively, the subscribers viewing may be monitored and their viewing preferences may be ascertained therefrom.

SUMMARY

A method for recommending audiovisual content items to a subscriber based on locations visited by the subscriber. The method comprises receiving location information from a mobile device having GPS functionality. The location information includes locations the subscriber has visited with the mobile device. An interest of the subscriber is predicted, wherein the predicted interest is based at least on the location information. One or more audiovisual content items associated with the predicted interest are selected. One or more item recommendations of available ones of the selected audiovisual content items are generated. A referral of the one or more item recommendations is presented to the subscriber.

A device for recommending audiovisual content items to a subscriber based on locations visited by the subscriber. The device comprises an interface to receive audiovisual content, an audio/video decoder to process the audiovisual content, an interface to provide the processed audiovisual content to a display, memory for storing location information, a processor, and a computer-readable storage medium to store instructions. The location information includes locations the subscriber has visited. When the instructions are executed by the processor they cause the processor to predict an interest of the subscriber based at least on the location information, select one or more audiovisual content items associated with the predicted interest, generate one or more item recommendations of available ones of the selected audiovisual content items, and present a referral of the one or more item recommendations to the subscriber.

A computer-readable storage medium containing stored instructions that when executed by a processor cause the processor to recommend audiovisual content items to a subscriber based on locations visited by the subscriber. Location information is received from a mobile device having GPS functionality. The location information includes locations the subscriber has visited with the mobile device. An interest of the subscriber is predicted based at least on the location information. One or more audiovisual content items associated with the predicted interest are selected. One or more item recommendations of available ones of the selected audiovisual content items are generated. A referral of the one or more item recommendations is presented to the subscriber.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Subscribers may have interests that are not related to their viewing preferences. Furthermore, the subscriber's interests may not be easily ascertained by having the subscriber answer questions posed by the system. These interests may be based on activities that the subscriber partakes in. The activities may be ascertainable based on locations that the subscriber visits. For example, if the subscriber visits a badminton court it may be predicted that they are either playing or watching badminton. If audiovisual content items related to badminton were available (e.g., a badminton match, a documentary on badminton), the subscriber may be interested in watching one or more of these audiovisual content items if they knew they were available. Utilizing the locations that the subscriber visits to select audiovisual content items that may associated with interests of the subscriber would increase the viewing experience for the subscriber.

The locations a subscriber visits may be determined using GPS functionality in a mobile device of the subscriber. The mobile device may be, for example, a tablet, a smart phone or a wearable device such as a smart watch (e.g., Apple Watch®) or activity tracker (e.g., Fitbit®). The mobile device may be capable of tracking the location of the subscriber over time (e.g., during the course of the day). The mobile device may record certain locations visited by the subscriber and identify what the locations are (e.g., determine that the GPS coordinates are associated with a church). The mobile device may track the most frequented locations.

Figure 2:
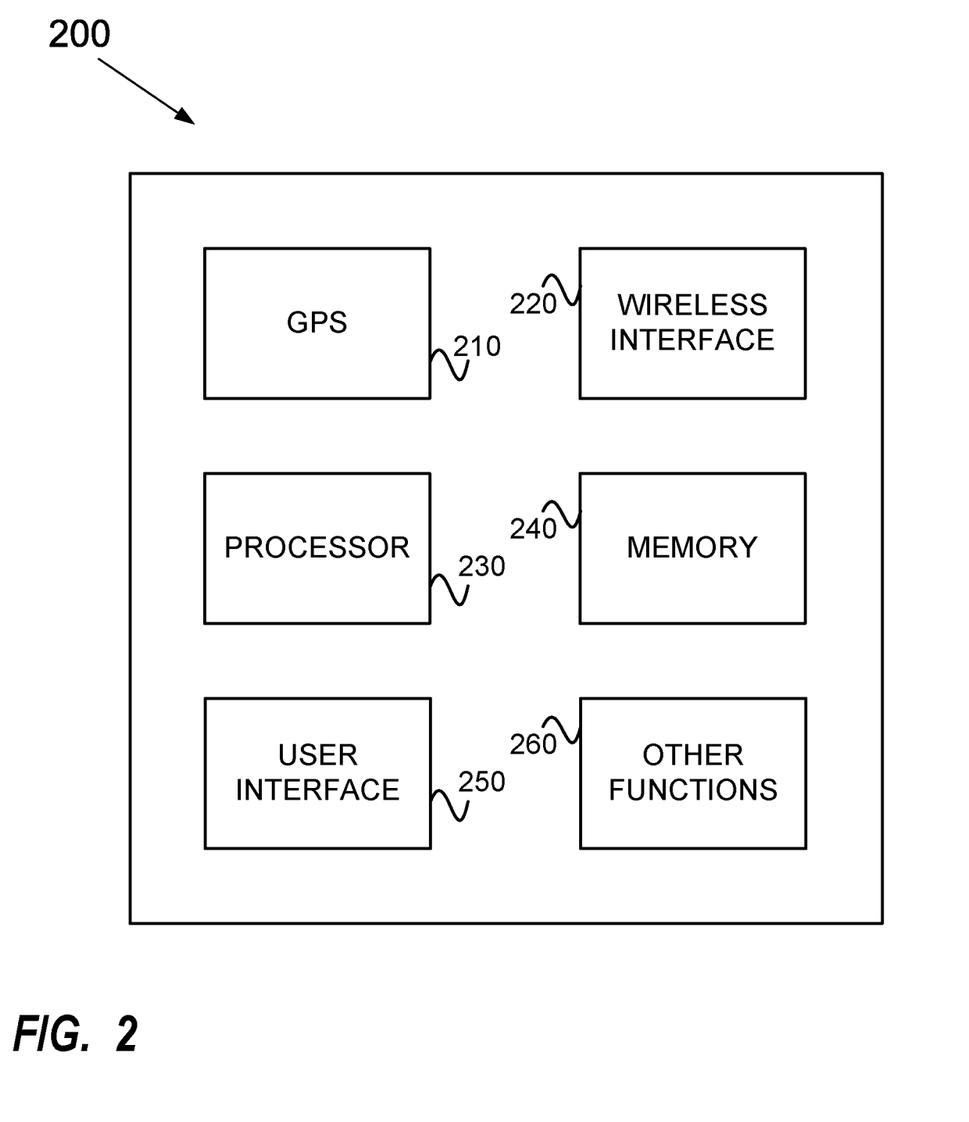
FIG. 2 illustrates an example high level system diagram of a generic mobile device that can be utilized to record locations visited by a subscriber.

FIG. 2 illustrates an example high level system diagram of a generic mobile device 200 that can be utilized to record locations visited by a subscriber. The mobile device 200 may include a GPS module 210, a wireless interface 220, a processor 230, memory 240, a user interface 250 and other functions 260 related to the operation of the specific mobile device 200. The GPS module 210 is to determine the location of the mobile device 200. The wireless interface 220 is to provide wireless communications with other wireless devices after a link between the wireless devices has been established. The wireless interface 220 may be, for example, WiFi (wireless local area networking based on the IEEE 802.11), Bluetooth (IEEE 802.15.1) or NFC (near field communications).

The processor 230 is to control the operation of the mobile device 200 and execute computer-executable instructions (e.g., software, apps). The memory 240 is to store the computer-executable instructions and/or other data. The memory 240 may be located on the processor 230 and/or may be separate from the processor 230. The memory 240 storing the computer-executable instructions may be computer-readable memory so that the processor 230 can read and execute the computer-executable instructions. According to one embodiment, a mapping app may be stored in the memory 240 and executed by the processor 230 and turn GPS coordinates captured by the GPS module 210 into specific locations (e.g., badminton courts, swim club). The locations may be stored in the memory 240. The location tracking/storing feature may be an optional feature (e.g., may need to be activated, may be deactivated).

The UI 250 is to provide information to the subscriber and enable the subscriber to interact with the device 200. As one skilled in the art would recognize, the types of UIs 250 may vary greatly based on the device 200. For example, the UI

250 may be a display, a touch screen display, buttons, keypad, speakers, and/or microphone (e.g., for voice interaction). The other functions 260 may vary based on the device 200. For example, if the device 200 was a mobile phone the other functions 260 may include a cell phone module. If the device 200 was an activity tracker the other functions 260 may include a heart rate monitor, sleep monitor and/or pedometer. If the device 200 was a computer or tablet capable of displaying audiovisual content the other functions 260 may include an audio/video decoder.

Figure 3:
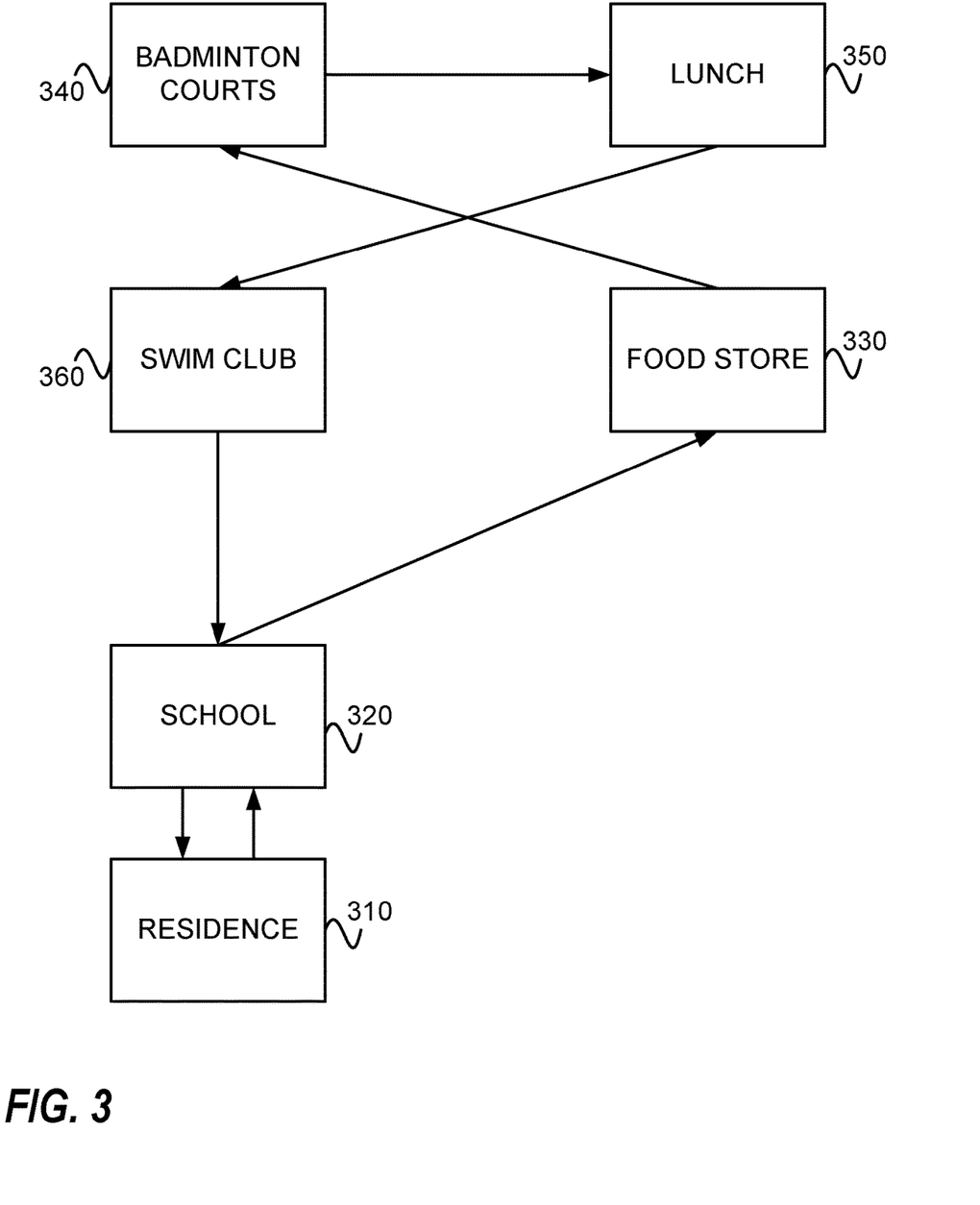
FIG. 3 illustrates an example course of travel for a subscriber during the course of a day that may be captured by the subscriber's mobile device, according to one embodiment.

FIG. 3 illustrates an example course of travel for a subscriber during the course of a day that may be captured by the subscriber's mobile device 200. It should be noted that the course of travel is illustrated in an overly simple manner. The subscriber starts at their residence 310 and then heads to school 320, for example, to drop their children off. After school 320 the subscriber heads to the food store 330. From the food store 330 the subscriber may travel to the badminton courts 340, for example, to play or watch badminton. The subscriber may then head to lunch 350 followed by the swim club 360, for example, to swim or watch a swimming event. The subscriber may then return to the school 320 prior to returning back to the residence 310. The mobile device 200 may capture these locations and store them in the memory 240.

When the mobile device 200 returns to the residence 310, the mobile device 200 may share the location information with, for example, the STB 150. The STB 150 may be equipped for wireless communications and may be configured to communicate with the mobile device 200.

Figure 4:
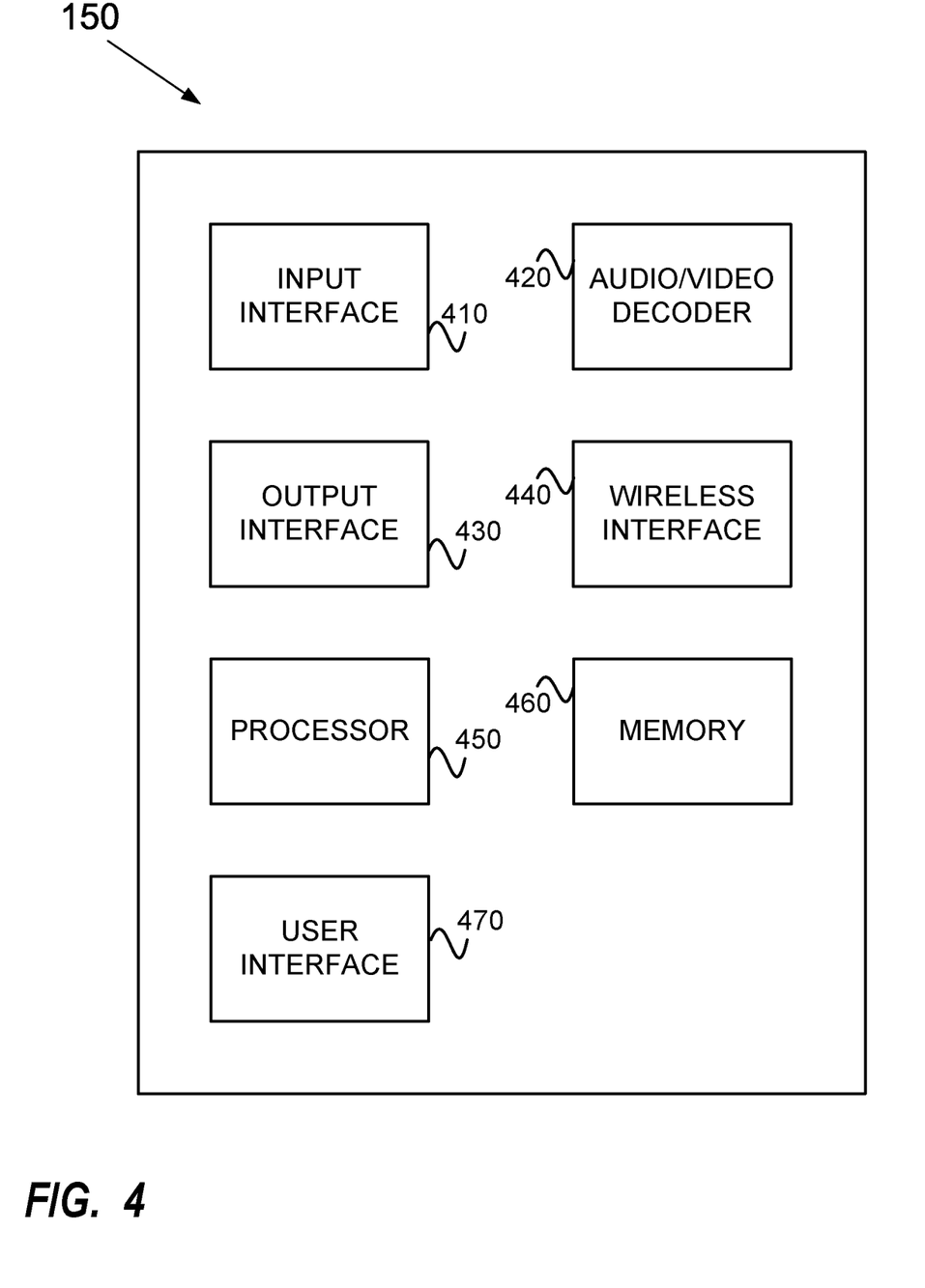
FIG. 4 illustrates an example high level system diagram of a STB.

FIG. 4 illustrates an example high level system diagram of a STB 150. The STB 150 may include an input interface 410, an audio/video decoder 420, an output interface 430, a wireless interface 440, a processor 450, memory 460, and a user interface 470. The input interface 410 is to receive content from the service provider via the network interface 140. The input interface 410 may be, for example, a coaxial connector and associated interface protocols. The content may be audiovisual content associated with a broadcast channel and/or an on-demand audiovisual content item selected for viewing. The content may also be an EPG that defines all the broadcast channels and/or on-demand audiovisual content items available to the subscriber. The audio/video decoder 420 is to decode/decompress the received audiovisual content. The output interface 430 is to provide the decoded/decompressed audiovisual content to a display device 160. The output interface 430 may also provide the EPG to the display device 160 when the EPG is activated. The output interface 430 may include one or more protocols and associated connectors (e.g., coaxial, HDMI, USB, component) as the decoded/decompressed audiovisual content may be provided to the display device 160 in one or more formats via an appropriate cable (e.g., coaxial, HDMI, USB, component).

The wireless interface 440 is to provide wireless communications (e.g., WiFi, Bluetooth, NFC) with other wireless devices after a link between the devices has been established. The processor 450 is to control the operation of the STB 150 and execute any computer-executable instructions (e.g., software, apps). The memory 460 is to store the computer-executable instructions and/or other data (e.g., EPG) and may be located on the processor 450 and/or may be separate from the processor 450. The memory 460 may be computer-readable memory so that the processor 450 can read and execute the computer-executable instructions stored therein. The UI 470 is to provide information to the subscriber and enable the subscriber to interact with the STB 150 (e.g., turn on/off, change channels, raise/lower volume, initiate EPG). The UI 470 may be, for example, a display, buttons, and/or a remote control interface, such as an infrared (IR) interface.

As both the mobile device 200 and the STB 150 have wireless interfaces 220, 440, they may communicate with one another once the communications link is established (once the mobile device 200 and the STB 150 have been paired). If the mobile device 200 (e.g., tablet, smart phone) connects to the service provider using a browser or an app, the communications may include the mobile device 200 acting as a UI for the STB 150 (e.g., turn on/off, select audio visual content items, change channels, raise/lower volume, initiate EPG). The communications may also include transferring the location information from the mobile device 200 to the STB 150. According to one embodiment, a transfer of location information function between the STB 150 and the mobile device 200 must be activated in order for the mobile device 200 to transfer location information to the STB 150. As the mobile device 200 may include location information that was previously transferred to the STB 150, the transfer of the location information may be synchronized so that only new (e.g., not previously transferred, added since last transfer) location information is transferred.

Figure 5:
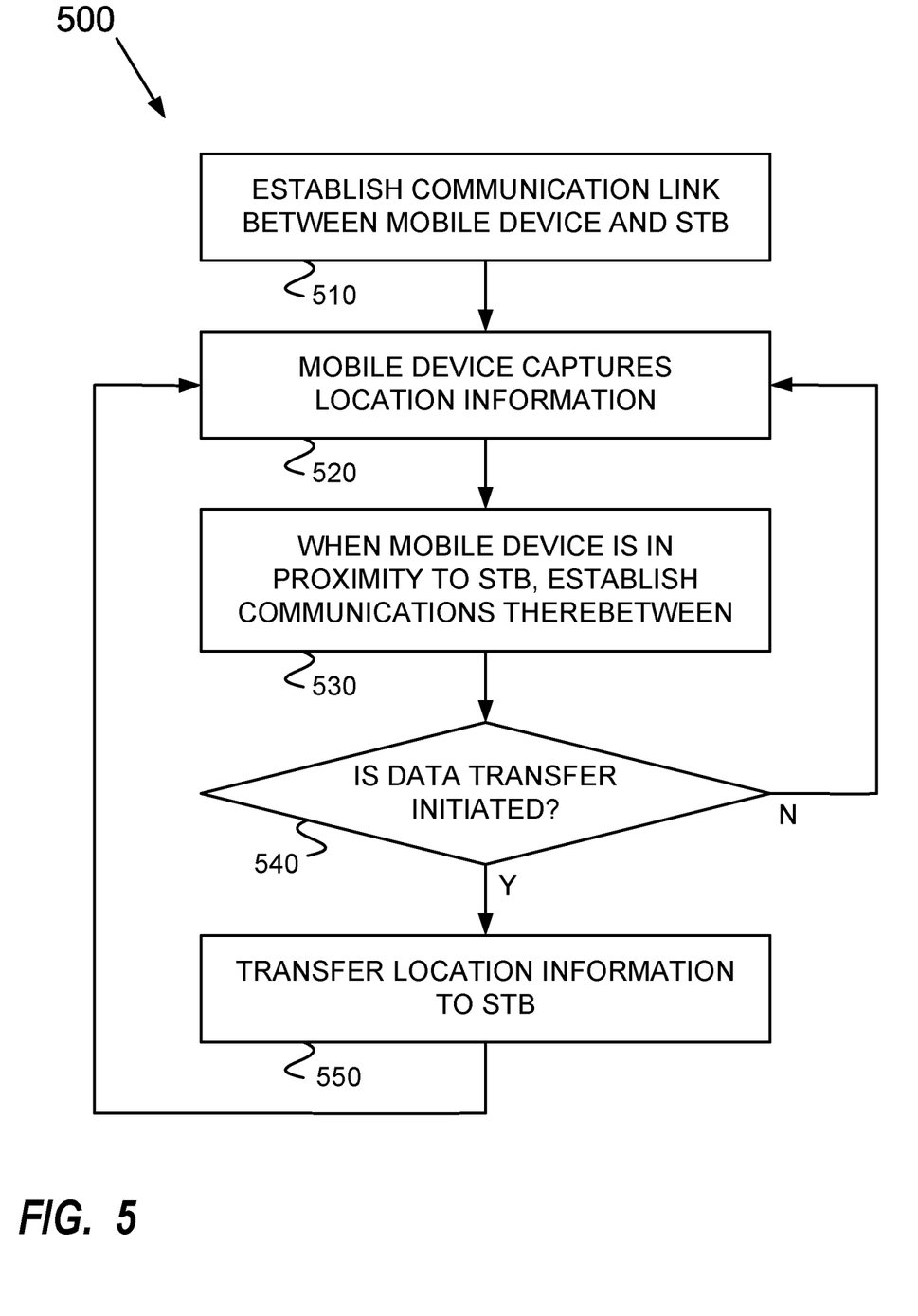
FIG. 5 illustrates an example method for the mobile device providing location information to the STB, according to one embodiment.

FIG. 5 illustrates an example method 500 for the mobile device 200 providing location information to the STB 150. Initially, the communication link between the STB 150 and the mobile device 200 is established 510 (the devices are paired). Assuming the location tracking function is active for the mobile device 200 and the subscriber has the mobile device 200 with them, the mobile device 200 captures location information for the subscriber as the subscriber goes about their activities (e.g., various locations of FIG. 3) 520. When the mobile device 200 is in close proximity to the STB 150 (e.g., the subscriber returns to the residence), the STB 150 and the mobile device 200 establish communications therebetween 530. A determination is then made as to whether the location information transfer function has been activated to allow the transfer between the devices 540. If the location information transfer function has not been initiated (540 No), then no data is transferred and the mobile device 200 continues to capture location information 520.

If the location information transfer function has been initiated (540 Yes), then the transfer of the location information from the mobile device 200 to the STB 150 is initiated 550. The data transfer may entail the STB 150 sending a request to the mobile device 200. The request may be for all location information captured since the last time the mobile device 200 transferred the location information thereto. According to one embodiment, the location information captured since last time would be all the location information not flagged as being previously transferred. According to one embodiment, the request may include a time stamp associated with the last time that the STB 150 received location information from the mobile device 200 (e.g., Mar. 10, 2017 at 6 am EST) and the mobile device 200 may transfer any location information that is time stamped after this.

Computer-executable instructions (e.g., software, apps) may be stored on a computer-readable storage medium (e.g., 240, 460). The computer-executable instructions when executed by a processor (e.g., 230, 450) may cause the processor to perform the method 500. The method 500 is in no way intended to be limited to the illustrated processes. Rather, additional processes can be added, processes can be combined, processes can be deleted, processes can be modified and/or the order of the processes can be modified without departing from the current scope.

The STB 150 may be capable of utilizing the location information to predict interests of the subscriber and then to select one or more audiovisual content items that may be associated with the predicted subscriber interests.

Figure 6:
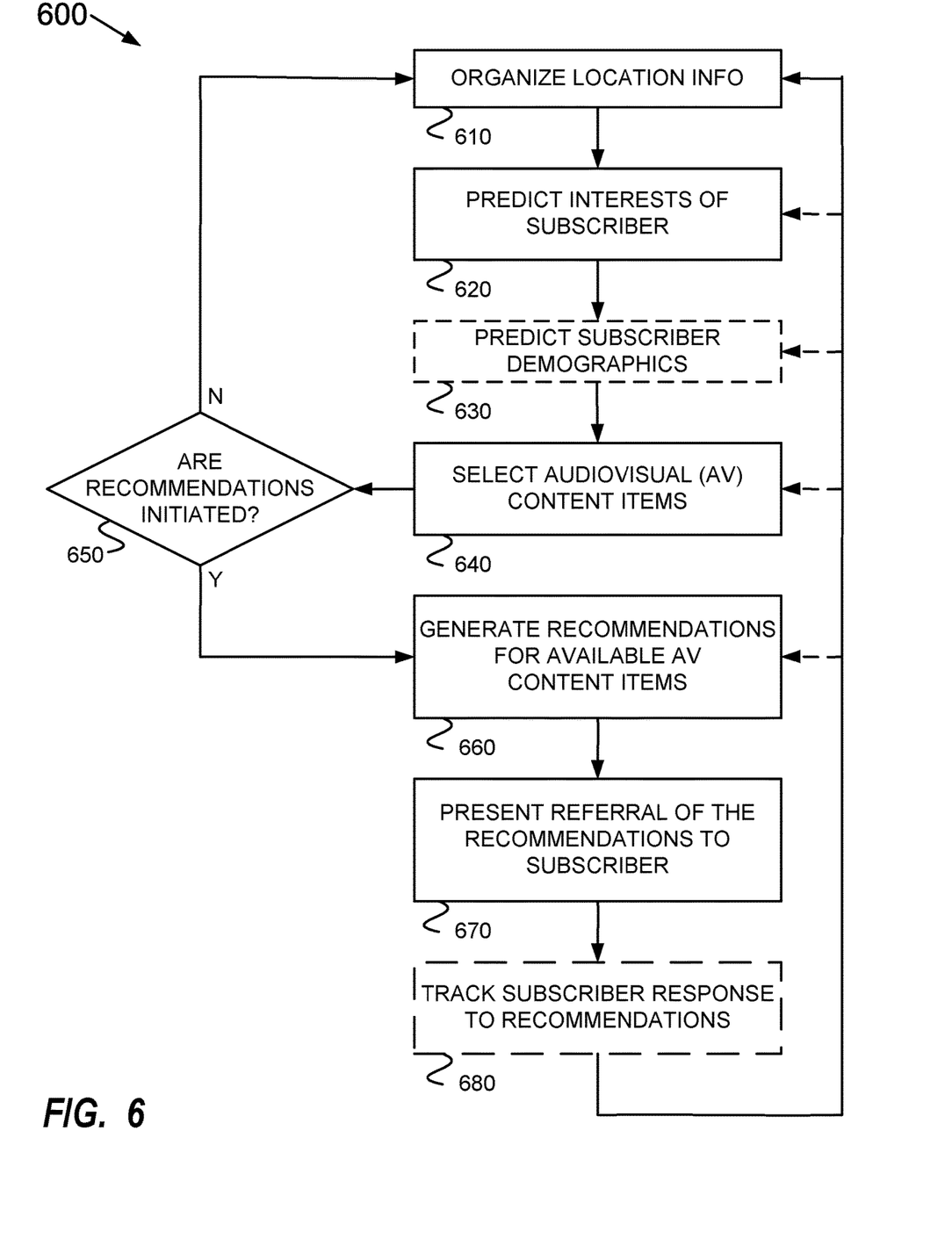
FIG. 6 illustrates an example method for the STB predicting subscriber interests based on location information and selecting one or more audiovisual content items associated therewith, according to one embodiment.

FIG. 6 illustrates an example method 600 for the STB 150 predicting subscriber interests based on location information and selecting one or more audiovisual content items associated therewith. The location information that is received from the mobile device 200 is organized 610. The organizing may include, for example, identifying number of times locations are visited by the subscriber, ranking the locations and grouping locations based on similarities between them (e.g., sports related, shopping, kid related).

A prediction of interests of the subscriber is generated based on the location information 620. For example, the predicted interest may be the subscriber likes badminton because they went to the badminton courts several times. The predicted interest may be the subscriber likes swimming because the subscriber went to the swim club several times. The predicted interest may be the subscriber likes football and the Philadelphia Eagles because the subscriber went to a Philadelphia Eagles game. The predicted interest may be the subscriber likes a certain category (e.g., automobiles) because they went to several locations grouped together under that category (e.g., a car dealership, an auto part store and a car wash). The predictions may be limited, for example, to the top ranked locations or only to locations visited at least a minimum number of times.

A prediction of demographics of the subscriber may optionally be made based on the location information and/or predicted interests 630. The demographics may include, for example, age, gender, race, religion, marital status, family size, and income level. The demographics may be predicted based on applying different heuristics to the location information and/or predicted interests. For example, if the subscriber visits food stores more than 4 times per week they are predicted to have children. If the subscriber visits a Mercedes dealer they are predicted to be in a high income bracket. If the subscriber is predicted to be interested in sports they are predicted to be male.

One or more audiovisual content items may be selected that are associated with the predicted interests of the subscriber, and optionally the predicted demographics, 640. For example, if predicted interests are that the subscriber likes football and the Philadelphia Eagles, audiovisual content items associated with football and the Philadelphia Eagles may be selected, including, for example, Philadelphia Eagles games, documentaries about the Philadelphia Eagles, and/or other football games not featuring the Philadelphia Eagles. If the predicted interests are the subscriber likes swimming, audiovisual content items for swimming matches may be selected. If the predicted interests are the subscriber likes automobiles, audiovisual content items for celebrity automobiles and/or automobile racing may be selected.

A determination is then made regarding whether an audiovisual content item recommendation function has been initiated 650. The initiation of the recommendation function may be made at the point when the subscriber wants the STB 150 to provide recommendations (basically the subscriber requests the recommendations). The initiation of the recommendation function may be programmed into the STB 150 to provide the recommendations at defined times (e.g., when the STB is turned on, at a defined time every day). If the recommendation function is not initiated (650 No), then no action will be taken and the method 600 restarts with the STB 150 organizing the location information that it receives 610.

If the recommendation function is initiated (650 Yes), then one or more item recommendations are generated for available ones of the one or more selected audiovisual content items 660. The available ones of the selected audiovisual content items may be determined by checking an audiovisual content schedule (e.g., EPG). The selected audiovisual content items may be considered available if they are currently available or will be in short order (e.g., within one hour) via broadcast channel or on-demand. The selected audiovisual content items may be considered available if they are not currently available but will be within a defined time period (e.g., within 24 hours, within one week). If selected audiovisual content items included automobile racing, swimming matches, and football games the audiovisual content schedule may indicate that one automobile racing audiovisual content item and three football game audiovisual content items were available (but no swimming matches were available). The item recommendations generated may be for one or more of these available audiovisual content items. The item recommendations may simply be the selected audiovisual content items available now or in the future. According to one embodiment, the item recommendations may be for viewing and/or recording of the available selected audiovisual content items now or may be for scheduling viewing and/or recoding of the available selected audiovisual content items in the future.

A referral to the one or more item recommendations may be presented to the subscriber 670. The referral may be a message that is displayed on the display. The location where the referral is presented may be configurable. The referral may enable the subscriber to accept or reject the item recommendation using the UI 470. The referral may enable the subscriber to select how to implement recommendation (e.g., view, record, schedule for recording). If the referral is accepted the item recommendation is initiated and the audiovisual content item may, for example, be displayed on the display device 160, recorded by digital video recording (DVR) functionality in the STB 150, scheduled for display on the display device 160 or scheduled for recording by the DVR. If the referral is rejected, no action is taken on the recommendation. If the referral is ignored for a defined period of time, the presentation is removed and no action is taken.

According to one embodiment, the referral may be presented to a single item recommendation at a time. According to one embodiment, the referral may be presented as a list of the one or more item recommendations. The referral may enable the subscriber to reject the item recommendations or to select one or more item recommendation from the list using the UI 470. According to one embodiment, the referral may be a customized EPG where the one or more item recommendations may be displayed first and/or highlighted in some fashion.

Location information continues to be collected from the mobile device and to be organized 610. The subscriber's response to the referrals may optionally be tracked 680. The responses may then be used in the prediction of subscriber interests 620, prediction of subscriber demographics 630, selection of audiovisual content items 640 and/or generation of item recommendations 660. For example, referrals to certain audiovisual content items being accepted often, or always, may result in an expansion of these referrals (e.g., referrals to audiovisual content items associated with badminton being accepted often may result in additional audiovisual items related to badminton being selected and/or more item recommendations being generated). Likewise, referrals accepted seldom, or never, may result in a reduction of these referrals (e.g., referrals to audiovisual content items associated with swimming not being accepted often may result in less audiovisual items related to swimming being selected and/or less item recommendations being generated).

Computer-executable instructions (e.g., software, apps) may be stored on a computer-readable storage medium (e.g., 460). The computer-executable instructions when executed by a processor (e.g., 450) may cause the processor to perform the method 600. The method 600 is in no way intended to be limited to the illustrated processes. Rather, additional processes can be added, processes can be combined, processes can be deleted, processes can be modified and/or the order of the processes can be modified without departing from the current scope.

The subscribers within the residence are likely to have more than one mobile device 200. The STB 150 may be configured to receive location information from more than one mobile device 200. As the mobile devices 200 may have captured the same location information (e.g., if one subscriber has more than one mobile device 200, if multiple subscribers are traveling together), the STB 150 may purge repeat data. The purging may be part of the organization of the location information 610. As the location information captured by two mobile devices 200 may not be exactly the same, the determination of repeat data may include a threshold with regard to the location and/or the time stamp associated with the location information.

According to one embodiment, the STB 150 may be configured to receive and organize location information for more than one subscriber. When the STB 150 is linked to the mobile devices 200 and the STB 150 is configured to activate location information transfer for the mobile devices 200, the mobile devices 200 may be associated with a particular subscriber. The subscribers may be identified, for example, as generic subscribers (e.g., subscriber 1, subscriber 2), family member (e.g., mom, dad, kid) or by name. All, or a subset or the processes 610-680, may be performed per subscriber.

The subscriber watching the display device (e.g., TV) 160 may be determined by determining which mobile device 200 is in close proximity to the STB 150. Once the subscriber is determined, the location information for that subscriber is received and organized 610 and may be utilized in the processes 620-680. It should be noted that predicted subscriber interests 620, selection of audio visual content items 640 and initiation of item recommendation functions 650 may have previously been processed for the subscriber prior to latest location information being added. If more than one subscriber is watching the display device 160 based on a determination that more than one mobile device 200 is in close proximity to the STB 150, the location information is received and the location information for the more than one subscriber is organized 610 and may be utilized in the processes 620-680. Previous predicted subscriber interests 620 and selections of audio visual content items 640 for the more than one subscriber may be utilized.

It should be noted that while the methods 500, 600 are described with respect to the STB 150, that they are not limited to being implemented thereon. For example, the methods 500, 600 could be implemented on computing devices 190. As described in FIG. 1, the subscriber can receive audiovisual content from the audiovisual content providers 110 on a computing device 190 via the Internet 130. The subscriber may use the Internet connection provided by their service provider (delivery network 120) or via some other network connection. In order for the subscriber to receive the audiovisual content they may log on to the service providers network.

As the computing device 190 may be a mobile device 200 (where the other functions 260 include an audio/video decoder), the location information may be captured by the computing device 190. The computing device 190 may communicate with one or more mobile devices 200 associated with the subscriber(s) and capture the location information therefrom. The computing device 190 may receive location information for multiple subscribers. According to one embodiment, the computing device 190 may link to the STB 150 and synchronize the location information therebetween.

The computing device 190 may include computer-readable instructions (e.g., software, apps) stored on a computer-readable storage medium (e.g., 240). The process readable instructions when executed by a processor (e.g., 230) may cause the processor to perform the methods 500 and the method 600.

The various processes described in methods 500, 600 could be distributed across platforms. For example, the STB 150 and/or computing device 190 could capture and organize the location information 610 and predict subscriber interests 620 and transmit the predicted subscriber interests to a headend of the delivery network 120 or a cloud server. The headend/cloud server could select audiovisual content items associated with the predicted interests and generate the recommendations for the available selected audiovisual content items. The recommendations could be provided to the STB 150/computing device 190 which could present referrals to the recommendations to the subscriber.

By way of another example, the referrals may be presented on, for example, a mobile device 200 (e.g., tablet) using an app or a browser. When the referral is accepted, the STB 150 may be notified to, for example, present the audiovisual content item identified in the referral on the display device (e.g., TV, media center) 160 or to record the audiovisual content item. Alternatively, the mobile device 200 may route the audiovisual content item identified in the referral to a computing device 190 having a larger display. Like Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

We claim:

1. A method performed by an electronic device of recommending audiovisual content items to a subscriber based on locations visited by the subscriber, the method comprising:

determining if a location information transfer function is activated in the electronic device, when a mobile device is proximate to the electronic device;

if the location information transfer function is activated in the electronic device, receiving location information from the mobile device, which has GPS functionality, wherein the location information includes locations the subscriber has visited with the mobile device;

organizing the location information by ranking the locations included in the location information based on a number of times visited, and determining different categories of content for grouping the locations based on similarities between the locations, each category including a plurality of locations with different location information associated with the category;

predicting an interest of the subscriber in audiovisual content based on the ranking of locations and at least one category of content;

selecting one or more audiovisual content items associated with the predicted interest;

generating one or more item recommendations of available ones of the selected audiovisual content items; and presenting a referral as a list of the one or more item recommendations to the subscriber, wherein the presenting the referral includes customizing an electronic program guide (EPG) to highlight the item recommendations, and the receiving of the location information from the mobile device further includes determining if the location information was previously received and transferring only new location information to the electronic device.

2. The method of claim 1, further comprising establishing a wireless linkage with the mobile device.

3. The method of claim 1, further comprising predicting subscriber demographics based on the location information.

4. The method of claim 1, further comprising determining if the selected audiovisual content items are available by checking an audiovisual content schedule.

5. The method of claim 1, further comprising receiving a selection of one of the one or more item recommendations by the subscriber as a subscriber response to the referral presented and taking appropriate action.

6. The method of claim 5, wherein the taking the appropriate action includes a subset of viewing associated audiovisual content item, recording the associated audiovisual content item, scheduling the viewing of the associated audiovisual content item, and scheduling the recording of the associated audiovisual content item.

7. The method of claim 1, wherein
the receiving location information includes receiving location information for a plurality of subscribers;
the predicting an interest includes predicting an interest for at least a subset of the plurality of subscribers;
the selecting one or more audiovisual content items includes selecting one or more audiovisual content items for at least a subset of the plurality of subscribers;
the generating one or more item recommendations includes generating one or more item recommendations for at least a subset of the plurality of subscribers; and
the presenting a referral includes presenting a referral of the one or more item recommendations at least a subset of the plurality of subscribers.

8. The method of claim 1, further comprising tracking feedback from the subscriber to the referral presented and using results of the tracking to periodically update the predicting of interests of the subscriber.

9. The method of claim 8, wherein the tracking includes determining a number of times any one of the one or more item recommendations presented to the subscriber are selected, rejected, or ignored by the subscriber.

10. An electronic device for recommending audiovisual content items to a subscriber based on locations visited by the subscriber, the device comprising:

a first interface to receive audiovisual content;
an audio/video decoder to process the audiovisual content;
a second interface to provide the processed audiovisual content to a display;
a processor communicatively coupled to a memory for storing location information, wherein the location information includes locations the subscriber has visited; and
a computer-readable storage medium to store instructions that when executed by the processor cause the processor to:
determine if a location information transfer function is activated in the electronic device, when a mobile device is proximate to the electronic device;
if the location information transfer function is activated in the electronic device, receive location information from the mobile device, which has GPS functionality, wherein the location information includes locations the subscriber has visited with the mobile device;
organize the location information by ranking the locations included in the location information based on a number of time visited, and determine different categories of content for grouping the locations based on similarities between the locations, each category including a plurality of locations with different location information associated with the category;
predict an interest of the subscriber in audiovisual content based on the ranking of locations and at least one category of content;
select one or more audiovisual content items associated with the predicted interest;
generate one or more item recommendations of available ones of the selected audiovisual content items; and
present a referral as a list of the one or more item recommendations to the subscriber,
wherein when the instructions are executed by the processor they further cause the processor to customize an electronic program guide (EPG) to highlight the item recommendations, and
when the electronic device receives the location information from the mobile device it is further configured to determine if the location information was previously received and transfer only new location information to the electronic device.

11. The electronic device of claim 10, further comprising a wireless interface to communicate with the mobile device having the GPS functionality that is capable of capturing the locations the subscriber has visited, wherein communications includes receiving the location information from the mobile device.

12. The electronic device of claim 10, further comprising a GPS module to capture the locations the subscriber has visited.

13. The electronic device of claim 10, wherein when the instructions are executed by the processor they further cause the processor to receive a selection of one of the one or more item recommendations by the subscriber as a subscriber response to the referral presented and perform an appropriate action, wherein the appropriate action includes one or more of: initiating presentation of associated audiovisual content item on a display, initiating recording of the associated audiovisual content item, initiating scheduling of the presentation of the associated audiovisual content item on a display, and initiating scheduling of the recording of the associated audiovisual content item.

14. The electronic device of claim 10, wherein the electronic device is a set top box (STB).

15. The electronic device of claim 10, wherein the electronic device is a computing device capable of displaying audiovisual content.

16. A non-transitory computer-readable storage medium stored in an electronic device and containing stored instructions that when executed by a processor cause the processor to recommend audiovisual content items to a subscriber based on locations visited by the subscriber by:
- determining if a location information transfer function is activated in the electronic device, when a mobile device is proximate to the electronic device;
- if the location information transfer function is activated in the electronic device, receiving location information from the mobile device, which has GPS functionality, wherein the location information includes locations the subscriber has visited with the mobile device;
- organizing the location information by ranking the locations included in the location information based on a number of times visited, and determining different categories of content for grouping the locations based on similarities between the locations, each category including a plurality of locations with different location information associated with the category;
- predicting an interest of the subscriber in audiovisual content based on the ranking of locations and at least one category of content;
- selecting one or more audiovisual content items associated with the predicted interest;
- generating one or more item recommendations of available ones of the selected audiovisual content items; and
- presenting a referral as a list of the one or more item recommendations to the subscriber,
- wherein when the instructions are executed by the processor they further cause the processor to customize an electronic program guide (EPG) to highlight the item recommendations, and
- the receiving of the location information from the mobile device further includes determining if the location information was previously received and transferring only new location information to the electronic device.

17. The non-transitory computer-readable storage medium of claim 16, wherein when the instructions are executed by the processor they further cause the processor to receive a selection of one of the one or more item recommendations by the subscriber as a subscriber response to the referral presented and perform an appropriate action, wherein the appropriate action includes one or more of: initiating presentation of associated audiovisual content item on a display, initiating recording of the associated audiovisual content item, initiating scheduling of the presentation of the associated audiovisual content item on a display, and initiating scheduling of the recording of the associated audiovisual content item.

* * * * *